US012298192B2

(12) United States Patent
Salvador Lou

(10) Patent No.: US 12,298,192 B2
(45) Date of Patent: May 13, 2025

(54) FORCE SENSOR FOR THE BOTTOM BRACKET OF A BICYCLE

(71) Applicant: BIKONE BEARINGS, S.L., Saragossa (ES)

(72) Inventor: Javier Salvador Lou, Saragossa (ES)

(73) Assignee: BIKONE BEARINGS, S.L., Saragossa (ES)

( * ) Notice: Subject to any disclaimer, the term of this patent is extended or adjusted under 35 U.S.C. 154(b) by 216 days.

(21) Appl. No.: 17/923,481

(22) PCT Filed: Apr. 27, 2021

(86) PCT No.: PCT/ES2021/070280
§ 371 (c)(1),
(2) Date: Nov. 4, 2022

(87) PCT Pub. No.: WO2021/224520
PCT Pub. Date: Nov. 11, 2021

(65) Prior Publication Data
US 2023/0194365 A1 Jun. 22, 2023

(30) Foreign Application Priority Data
May 5, 2020 (ES) ................ ES202030392

(51) Int. Cl.
G01L 1/22 (2006.01)
B62J 45/41 (2020.01)
(Continued)

(52) U.S. Cl.
CPC ............. G01L 1/2262 (2013.01); B62J 45/41 (2020.02); B62J 45/421 (2020.02); B62K 19/34 (2013.01);
(Continued)

(58) Field of Classification Search
CPC ....... G01L 1/2262; B62J 45/41; B62J 45/421; B62K 19/34; B62M 3/003; B62M 6/50; G01B 7/18
See application file for complete search history.

(56) References Cited

U.S. PATENT DOCUMENTS 4,094,192 A * 6/1978 Watson ................ G01L 5/1627
73/1.15
4,911,024 A * 3/1990 McMaster ............. G01L 5/1627
73/862.045
(Continued)

FOREIGN PATENT DOCUMENTS

CN 101231203 A 7/2008
CN 109572915 A 4/2019
(Continued)

OTHER PUBLICATIONS

EP-2695805-A1, English Translation (Year: 2014).*
(Continued)

Primary Examiner — Ryan D Walsh
(74) Attorney, Agent, or Firm — Notaro, Michalos & Zaccaria P.C.

(57) ABSTRACT

A force sensor is disclosed for the bottom bracket of a bicycle, designed as a hollow cylindrical piece divided into an outer ring with an indentation along the entire perimeter thereof to accommodate a mechanical stop, an inner ring and a central ring with at least four openings disposed around the perimeter and which are positioned such that they form four arms, two identical arms having a larger arc in the vertical axis and two identical arms having a smaller arc in the horizontal axis, with at least one sheer strain gauge placed on each arm having a smaller are and at least one bending strain gauge on each arm having a larger arc. This strain gauge arrangement allows the effective force to be measured by omitting parasitic forces, thereby obtaining precise infor- (Continued)

mation regarding the power exerted by a cyclist, which is useful for optimising motors in electric bikes.

7 Claims, 4 Drawing Sheets

(51) Int. Cl.
*B62J 45/421* (2020.01)
*B62K 19/34* (2006.01)
*B62M 3/00* (2006.01)
*B62M 6/50* (2010.01)
*G01B 7/16* (2006.01)

(52) U.S. Cl.
CPC .............. *B62M 3/003* (2013.01); *G01B 7/18* (2013.01); *B62M 6/50* (2013.01)

(56) References Cited

U.S. PATENT DOCUMENTS

| | | | |
|---|---|---|---|
| 8,746,081 B2 * | 6/2014 | Sasaki | B62J 45/421 |
| | | | 73/862.045 |
| 2010/0282001 A1 * | 11/2010 | Sasaki | B62K 19/34 |
| | | | 73/862.49 |
| 2012/0285264 A1 * | 11/2012 | Sasaki | G01L 5/162 |
| | | | 73/862.045 |
| 2013/0024137 A1 | 1/2013 | Grass | |
| 2016/0052583 A1 * | 2/2016 | Sasaki | G05G 1/30 |
| | | | 74/594.4 |
| 2016/0052584 A1 * | 2/2016 | Sasaki | G01L 3/24 |
| | | | 74/594.4 |
| 2022/0355357 A1 * | 11/2022 | Inhelder | B21C 51/00 |

FOREIGN PATENT DOCUMENTS

| | | | | |
|---|---|---|---|---|
| DE | 102010018658 A1 | | 12/2010 | |
| EP | 1361822 A2 | | 11/2003 | |
| EP | 2695805 A1 | * | 2/2014 | ............ B62M 3/003 |
| WO | WO-2005021368 A1 | * | 3/2005 | ............ B62M 23/02 |

OTHER PUBLICATIONS

WO-2005021368-A1, English Translation (Year: 2005).*
International Search Report; Jun. 14, 2021.
International Application Status Report; obtained Oct. 29, 2022.
International Written Opinion; Jun. 14, 2021.

* cited by examiner

FORCE SENSOR FOR THE BOTTOM BRACKET OF A BICYCLE

As the title indicates, this description refers to a sensor which, by measuring the deformation of the bottom bracket due to the load applied to the crank axle, can calculate the output applied by a bicycle rider. This sensor has a deformation element with a specific geometry containing the measuring elements. The set is designed and connected in such a way that it provides an accurate measurement of the effective pedalling output, ignoring any parasitic force or independently of the gear combination used.

BACKGROUND OF THE INVENTION

Nowadays, the use of pedal power meters is becoming more and more popular in the biking world. Many of these pedal power meters are based on deformation sensors placed on different components of the bicycle. These components where the sensors are placed are usually the crank, the spider or the axle.

The purpose is to get information as real as possible of the output developed by the rider, mainly with two objectives: The first one: send this information to a display, so that the bike rider can be aware of the effort done during the competition and/or training and be able to adapt the necessary force at every moment. The second one: it is very useful to know the output achieved by a rider and send this information to the motor, so that the motor can at every moment provide the necessary power, with the consequent energy savings, the optimization of the performance of the motor and its control.

One of the great challenges in the development of a power meter is to calculate the effective pedalling output with sufficient accuracy for users, ignoring the forces that do not directly or indirectly produce torque.

Each bicycle rider has a particular pedalling style that produces "parasitic" or non-effective forces, and this is the great challenge in the development of a power meter. This is the reason why many power meter developments cannot get into the market because they do not have the necessary accuracy.

The goal of this invention is to solve this problem and therefore, we have designed a reliable force sensor with unique features that represent an important advance in the state of the art.

A close antecedent to our invention may be the document EP2104537, which describes a part, known as spider in the bike world, with a very specific design to measure the deformation of the mentioned part when the rider applies a pedalling force. For this purpose, it uses deformation sensors placed at the points where the reading can be accurate for the desired goal, which is to know the actual pedalling output of the rider.

Another antecedent is the patent (US 2017/0356816 A1), where it is described an integrated power meter in the bottom bracket of a bicycle, and for this purpose, it uses pressure sensors placed between the bearing and the bicycle or some blocks with strain gauges. Both designs do not consider these parasitic forces and the particular pedalling style of the rider, which makes their launch into the market impossible due to their lack of accuracy. It neither resolves how to discriminate the force difference generated in the bearing by the use of different chain ring or sprocket, with the application of the same torque.

The independent measurement of each leg adds accuracy to the measured results, since the force applied by each leg is different. The patent ES1101230 proposes a new solution so far, taking not only the measurement of the force applied by one leg, but duplicating the sensors, i.e., using strain gauges placed on both cranks to calculate the output through their deformation to obtain the power.

However, with the application of the measurement on the bottom bracket, the values obtained are more accurate because it is possible to measure with more precision the force applied by both legs, which as mentioned above is never equal, placing the strain gauge in a central point, reducing costs considerably because we avoid the duplication of electronic components and calibrations.

DESCRIPTION OF THE INVENTION

The force sensor for bicycle bottom bracket of this invention is specially designed to have a deformation behaviour proportional to the force applied by each of both legs.

In this specific case, the bottom bracket load sensor geometry of this invention is designed to measure the shear and deflection arising in the part containing the deformation sensors. As mentioned in the previous paragraph, the balance between stiffness and the measurement signal is critical, therefore a very well calculated part geometry design is necessary. It measures the force applied by the rider on the pedals, which is the propelling part of the bicycle's powertrain, converting the reciprocal motion of the rider's legs into a rotational motion used to move the bicycle's chain, which then moves the rear wheel. This force is not constantly applied, it is not equal in both legs, it isn't uniform. To sum up, it is affected by multiple variables, which generate parasitic forces that disturb the actual reading of the applied force, eliminating these parasitic forces and ensuring a true reading is implicit in the load sensor geometry of our invention.

The result is a hollow cylindrical shape, forming three rings with specific functions.

The outer ring is inserted into the bearing and this bearing is crossed by the crank axle, remaining the bearing as a ring around this axle. When the crank axle rotates as a result of the pedalling action, the load sensor remains fixed, while the bearing rotates and is deformed under the action of the applied forces. Therefore, this outer ring has some additional features.

One of them is its radial free movement, that is, there is a gap between the outer face of the ring and the bottom bracket. And another very important feature is a mechanical stop made of an elastic material, which limits the deformation of the sleeve due to the mentioned gap and avoids cracks or readings out of measurement scales.

The inner ring is designed to insert and fix the sensor in the correct position in the bottom bracket, by means of fastening mechanisms for this connection method. This inner ring can optionally be fixed directly to the frame.

The central ring, placed between the two above mentioned rings, is specially designed to contain the deformation sensors. This central ring has at least four openings distributed along its perimeter to get a minimum of four arms, the half of a major arch length and another half of a minor arch length. These arches are arranged so that a symmetrical piece is configured.

Deformation sensors are placed on the arms of a smaller arch length and these deformation sensors are placed and match the horizontal axis and are used for the measurement of the shear effort. The special geometry of this part, which is the result of a long testing process, allows an accurate reading of the deformations without parasitic forces.

Deformation sensors are also placed on the arms of a longer arch length. These deformation sensors are placed and match the vertical axis and are used to measure the deflection. We would like to point out again that the very special geometry of this part, which is the result of a long testing process, is suitable for an accurate reading of these deformations without parasitic forces.

In addition, the deformation sensors are connected together to form a complete Wheatstone bridge circuit to compensate the temperature changes that can disturb the measurement. These changes can be caused by the heat released by the bearings during the performance and by changes of the ambient temperature.

This force sensor for bicycle bottom bracket is installed on the same side as the set of chain ring, sprocket and chain, so that it allows an accurate compensation of chain ring or sprocket changes. As an option, a force sensor could also be placed on the opposite side.

Another important design feature of this deformation part is that it is suitable for both high or low pedalling speeds and properly detects the pedalling output at any moment.

In this description, the object of this invention is a deformation sensor that provides a true reading of the developed power at every moment; therefore, this device can be calibrated before its installation on the bottom bracket.

The bottom bracket load sensor converts a mechanical variation into an electrical signal. This mechanical variation is produced by the pedalling force and the electrical signal is converted by means of an algorithm into data. The combination of force data, cadence data and distance data, applying an algorithm, gives as a result the power that we transform into watts.

This information is transmitted in real time to a display or other device. In the case of electric bicycles, it can be used for the motor to provide the rider with the necessary assistance to maintain the desired cadence or speed.

All information concerning examples or embodiments is contained in the description of the invention.

DESCRIPTION OF THE DRAWINGS

To have a better understanding of this invention, the annexed drawing represents a preferred practical embodiment of it.

PREFERRED EMBODIMENT OF THE INVENTION

Figure 1:
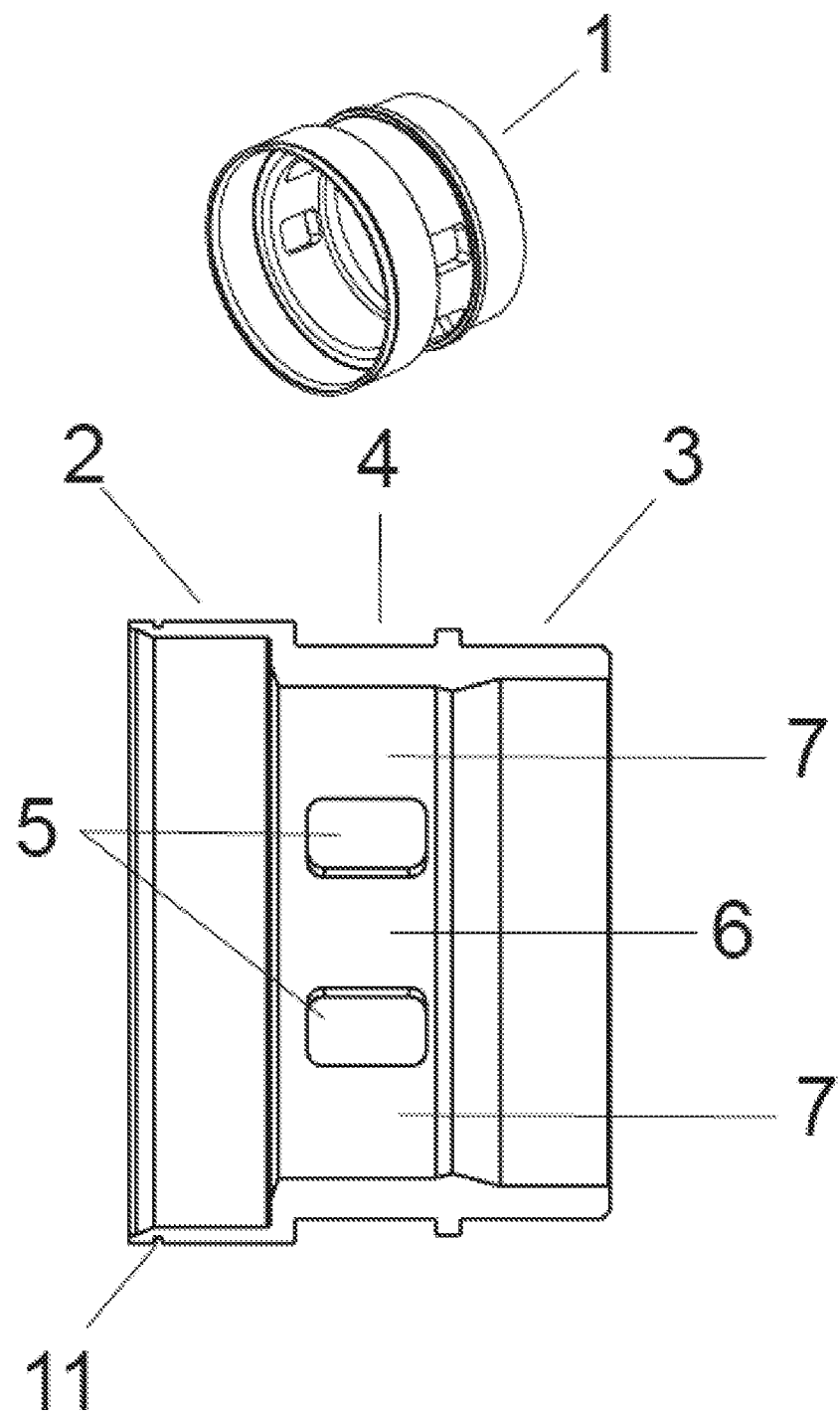
FIG. 1.—Shows the cylindrical part (1) as designed to measure shear and deflection.

The device of this invention shows in FIG. 1 the hollow cylindrical part (1) with three differentiated rings or parts. In the outer ring (2) a bearing (10) is fitted on its inner perimeter. Along the outer perimeter there is a slit (11) which houses the mechanical stop (12). The inner ring (3) has the function of being mounted and fixed to the bottom bracket. The central ring (4) is specially designed to measure the shear and deflection caused by the deformation of the bearing (10) integrated in the sensor, due to the force applied by the rider while pedalling. The reading must be accurate, free of parasitic forces, that is, it must be able to detect the deformation with very different applied forces.

We would like to emphasize that the perimeter of the central ring (4) has four openings (5). The arrangement of these openings (5) is not equidistant around the perimeter of the central ring (4), but they are arranged so that they form four arms. Two of them have the same of a major arch (7) and the other two have the same length of a minor arch (6).

Figure 2:
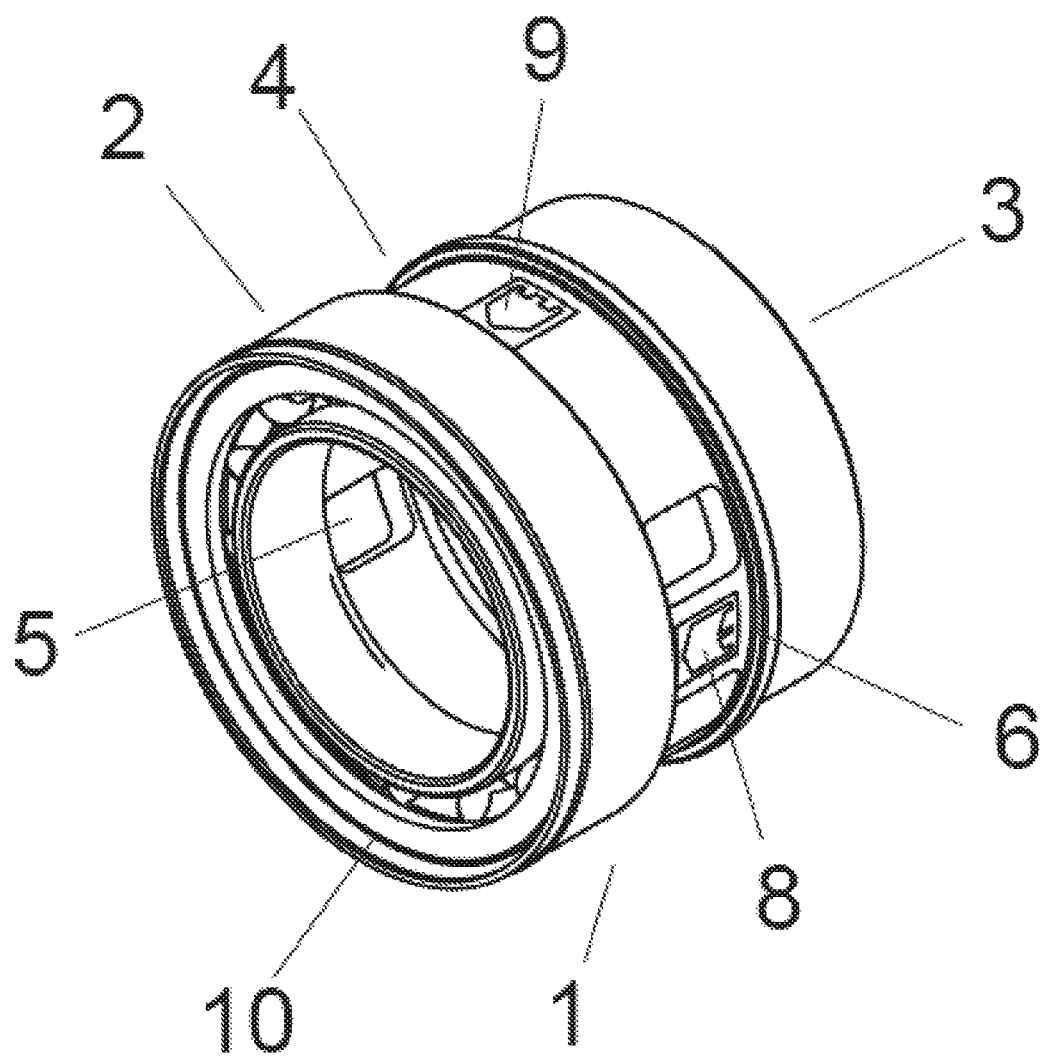
FIG. 2.—Shows the cylindrical part (1) with the shear deformation sensors (8), the deflection deformation sensors (9) and the embedded bearing (10).

The device, object of the present invention shows in the FIG. 2 the cylindrical part (1) graded, with the inserted bearing (10) described in the previous paragraph. It also shows in the central ring (4) the minor arch (6) positioned on the horizontal axis, where the shear deformation sensors (8) are placed matching the mentioned horizontal axis. On the vertical axis the major arch (7), where the deflection deformation sensors (9) are positioned, matching the vertical axis. It must be emphasized that the characteristic design of this cylindrical part (1), which measures the shear in the horizontal axis and the deflection in the vertical one, has as main purpose the elimination of the parasitic forces produced in the deformation of the bearings (10) of the bottom bracket (14), when applying the pedalling force.

Figure 3:
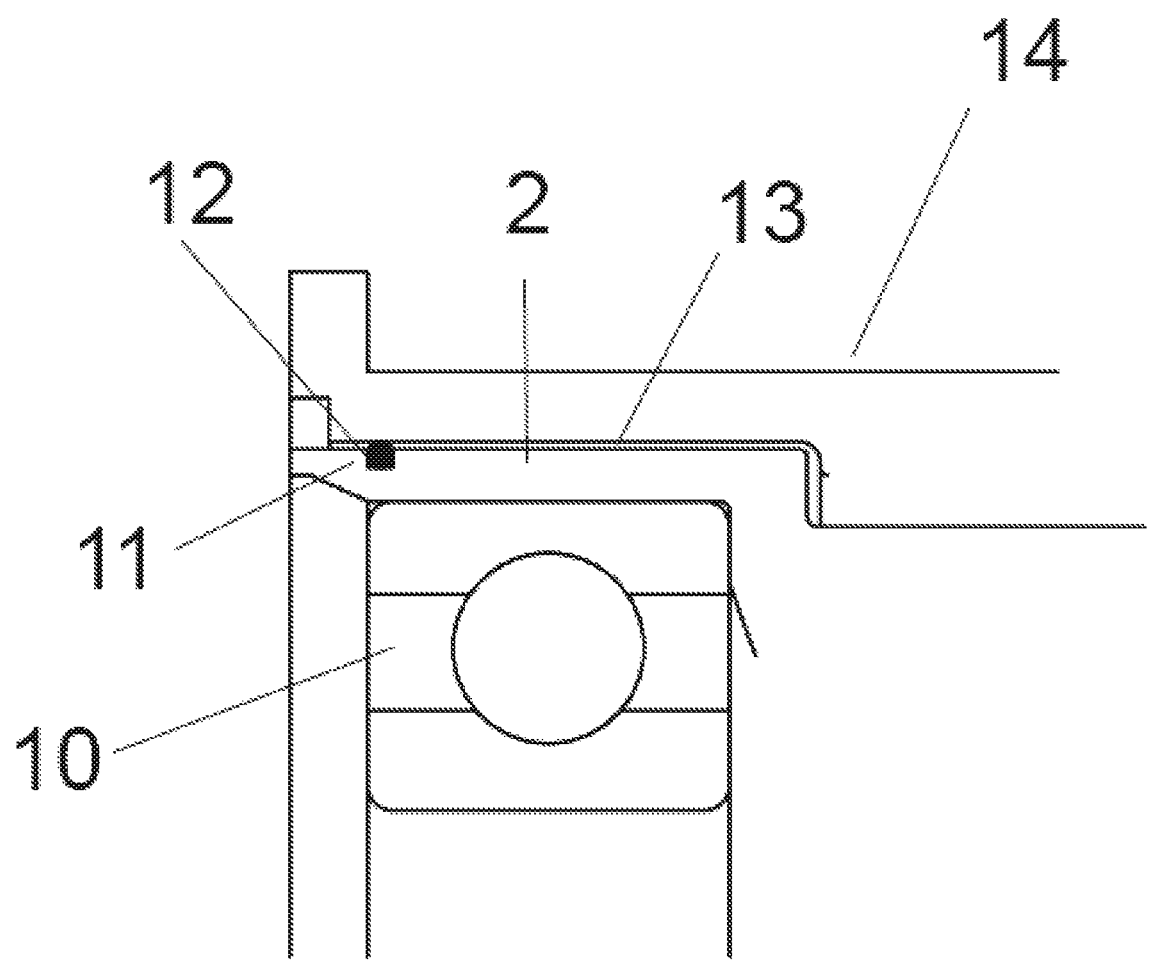
FIG. 3.—Shows a detail of the cylindrical part (1) with the mechanical stop (12).

The detail of FIG. 3 shows a sectional view of the outer ring (2) with the bearing (10) fitted and mounted on the bottom bracket (14). This detail shows the radial movement freedom of the outer ring with that gap (13) between the bottom bracket (14) and the outer ring (2). It is also shown the detail of the mechanical stop (12) inserted in the slit (11).

Figure 4:
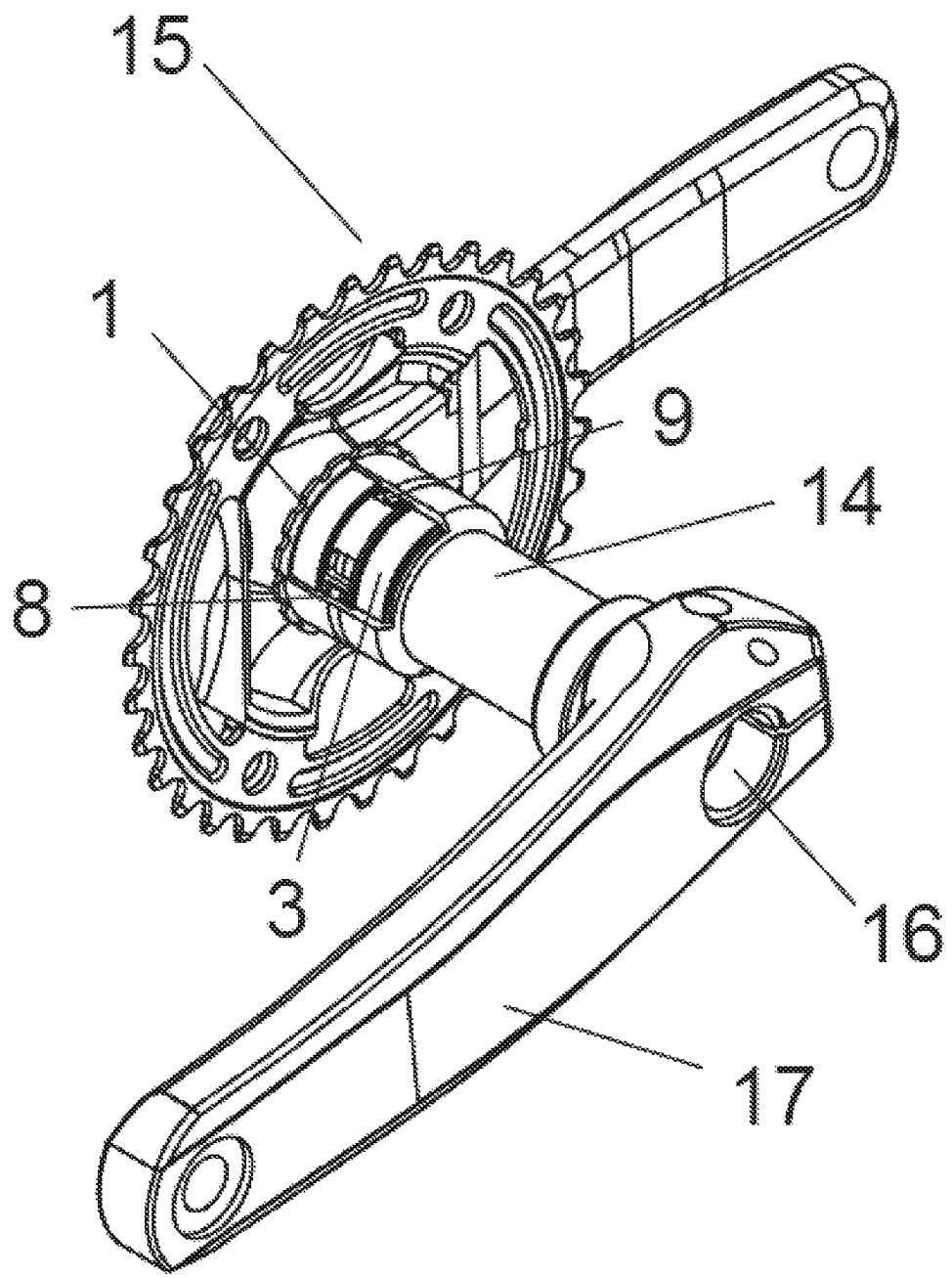
FIG. 4.—Shows the force sensor installed in the bottom bracket (14) and its position on the axle (16) in relation to the cranks (17) and chain ring (16).

The FIG. 4 of the device object of the present invention shows the load sensor mounted on the same side of the chain ring (15). The force sensor is fixed to the bottom bracket (14) and covered by an outer housing. The bottom bracket (14) with the force sensor mounted on the frame between the cranks (17) and with the axle (16) passing through the interior. This figure contributes to the understanding of the fact that when the crank (17) axle (16) rotates as a result of the pedalling action, the load sensor remains fixed, while the bearing (10) also rotates and is deformed under the action of the applied forces. It can also be seen the matching position to the horizontal axis of the shear deformation sensors (8) and the matching position to the vertical axis of the deflection deformation sensors (9). The characteristics of this sensor make that it is suitable for the measuring of output at both high and low speeds and for the compensation of sprocket or chain ring changes.

An algorithm converts the data collected by the shear deformation sensors (8) and the bending deformation sensors (9) making them usable for the correct performance of an electric motor incorporated in a bicycle or for the reading of the output developed by the rider at every moment.

The specialized person in this technology will easily understand that it is possible to combine features of different embodiments with features of other possible embodiments, provided that such a combination is technically supported.

The invention claimed is:

1. A force sensor for a bicycle bottom bracket (14) comprising;
   an outer ring (2) with a slit all around perimeter (11) thereof as a housing for at least one mechanical stop (12),
   an inner ring (3),
   a central ring (4) between the outer ring and the inner ring, with at least four openings (5) arranged around a perimeter thereof to form four arms, two of the four arms having a first length to each form a major arch (7) and the other two of the four arms having a second length to each form a minor arch (6), the first length greater than the second length, one major arch (7) and one minor arch (6) arranged symmetrically opposite from the other major arch (7) and minor arch (6), respectively, around the perimeter, at least one shear deformation sensor (8) placed on each of the arms forming the minor arches (6) and at least one deflection deformation sensor (9) placed on each of the arms forming the major arches (7).

2. The force sensor for a bicycle bottom bracket (14) according to claim 1, wherein the outer ring (2) of the cylindrical part (1) is used as a housing for a bearing (10).

3. The force sensor for a bicycle bottom bracket (14) according to claim 1, wherein the outer ring (2) and the bottom bracket (14) have a gap (13) therebetween so that the outer ring (2) has radial movement freedom.

4. The force sensor for a bicycle bottom bracket (14) according to claim 1, wherein the mechanical stop (12) is made of an elastic material.

5. The force sensor for a bicycle bottom bracket (14) according to claim 1, wherein the inner ring (3) of the cylindrical part (1) has suitable facilities for being mounted and fixed to the bottom bracket (14).

6. The force sensor for a bicycle bottom bracket (14) according to claim 1, wherein the shear deformation sensors (8) and the deflection deformation sensors (9) are connected to form a full Wheatstone bridge circuit to compensate for temperature changes.

7. The force sensor for a bicycle bottom bracket (14) according to claim 1 wherein the force sensor is configured to calculate a force applied by each of a rider's legs at a same time.

\* \* \* \* \*